United States Patent [19]

Kaugars

[11] 3,930,021

[45] Dec. 30, 1975

[54] COMPOSITIONS AND METHODS OF COMBATTING ARTHROPODAL PESTS USING PHENYLHYDROZONE DERIVATIVES

[75] Inventor: Girts Kaugars, Kalamazoo, Mich.

[73] Assignee: The Upjohn Company, Kalamazoo, Mich.

[22] Filed: July 13, 1970

[21] Appl. No.: 54,620

[52] U.S. Cl. .............................. 424/327; 260/566 B
[51] Int. Cl.[2] ............................................ A01N 9/20
[58] Field of Search .............. 424/327; 260/566 B

[56] References Cited
UNITED STATES PATENTS

| | | | |
|---|---|---|---|
| 2,786,044 | 3/1957 | Warner et al. ............... | 260/566 B X |
| 2,818,367 | 12/1957 | Jaworski et al. .................... | 424/327 |
| 3,235,447 | 2/1966 | Urbschat et al. ............... | 424/327 X |

OTHER PUBLICATIONS

Humphries et al., J. Chem. Soc., 127, pp. 1304–1307 (1925).
Jones et al., J. Org. Chem. 26, pp. 228–232 (1961).

*Primary Examiner*—Albert T. Meyers
*Assistant Examiner*—Allen J. Robinson
*Attorney, Agent, or Firm*—Roman Saliwanchik; Carl A. Randles, Jr.

[57] ABSTRACT

Certain (α-fluoroalkyl)benzoyl chloride phenylhydrozones have been found to be anthelmintics and active against arthropod pests. The benzoyl ring and the phenylhydrazone ring can be otherwise substituted with, for example, halogen, nitro, another α-fluoroalkyl group, or an alkyl group.

17 Claims, No Drawings

COMPOSITIONS AND METHODS OF COMBATTING ARTHROPODAL PESTS USING PHENYLHYDROZONE DERIVATIVES

SUMMARY OF INVENTION

This invention pertains to new chemical compounds, a new method of combatting arthropod pests; and new anti-arthropodal formulations. The invention is more particularly directed to new (α-fluoroalkyl)benzoyl chloride phenylhydrazones, to new (α-fluoroalkyl)benzoic acid 2-phenylhydrazide intermediates, a new method of combatting arthropod pests using the new (α-fluoroalkyl)benzoyl chloride phenylhydrazones, and to new anti-arthropodal formulations comprising the new (α-fluoroalkyl)benzoyl chloride phenylhydrazones.

The certain new insecticidal and miticidal (α-fluoroalkyl)benzoyl chloride phenylhydrazones of this invention have the general structural formula

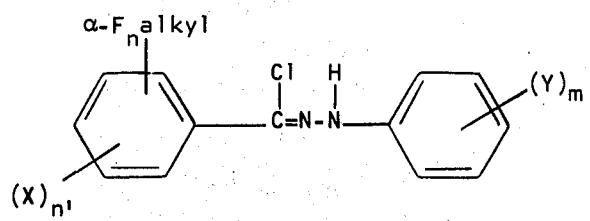

wherein α-$F_n$alkyl is an α-fluoroalkyl group of from 1 to 3 carbon atoms, inclusive; X is halogen (chlorine, bromine, iodine, and fluorine), nitro, alkyl of from 1 to 6 carbon atoms, inclusive, and α-$F_n$alkyl; Y is alkyl of from 1 to 6 carbon atoms, inclusive, α-$F_n$alkyl, halogen, and nitro; n is an integer 2 or 3, n' is an integer 0 to 3, inclusive; and m is an integer from 0 to 3, inclusive, the sum of n' +m being not more than 5, the sum of carbon atoms in alkyl substituents being not more than 15, there being no more than one nitro group in the molecule, and no more than two α-$F_n$alkyl groups on any one benzene ring or three total.

DETAILED DESCRIPTION OF THE INVENTION

The new anti-arthropodal (α-fluoroalkyl)benzoyl chloride phenylhydrazones of this invention are readily prepared by reacting a selected (α-fluoroalkyl)benzoic acid 2-phenylhydrazide with phosphorus pentachloride, reacting the resulting, corresponding (α-fluoroalkyl)benzoyl chloride (dichlorophosphinyl)-phenylhydrazone with phenol, and recovering the desired (α-fluoroalkyl)benzoyl chloride phenylhydrazone. The process can be represented as follows:

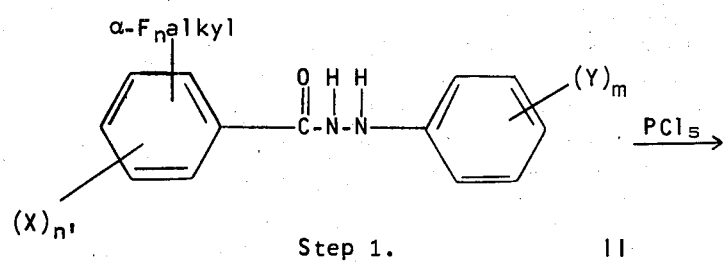

Step 1.                     II

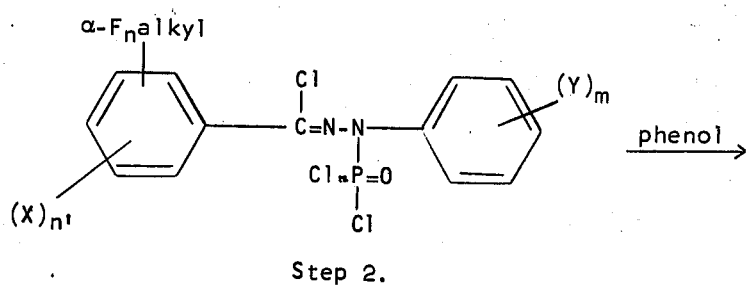

Step 2.

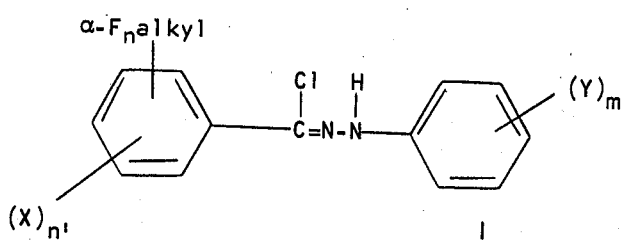

I

Step 1. of the foregoing process proceeds when the (α-fluoroalkyl)benzoic acid 2-phenylhydrazide starting compound (compounds of Formula II, above) and the phosphorus pentachloride are mixed in the presence of a reaction medium at a temperature in the range of about 10°C. up to about the boiling point of the reaction medium. Higher and lower temperatures can be used, however. The reaction rate will be decreased at low temperatures, and a pressure vessel would be needed to effect reaction temperatures above the boiling point at atmospheric pressure. In accordance with a preferred embodiment, the initial reaction mixture is heated.

Appropriate reaction media include, for example, the chlorinated hydrocarbon solvents, aliphatic or aromatic hydrocarbon solvents, and ethers. Representative specific ones are carbon tetrachloride (preferred), methylene chloride, chloroform, 1,2-dichloroethylene, benzene, toluene, technical hexane, diethyl ether, and dioxane.

The process can be practiced without isolating the (α-fluoroalkyl)benzoyl chloride (dichlorophosphinyl)-phenylhydrazone intermediate when three equivalents or more of phenol are added to the initial reaction mixture after it has been cooled to about 0° to 25° C. The phenol reacts with the (α-fluoroalkyl)benzoyl chloride (dichlorophosphinyl)-phenylhydrazone intermediate to produce triphenyl phosphate, and the desired (α-fluoroalkyl)benzoyl chloride phenylhydrazone is then recovered and purified by conventional methods. The solvent medium is removed by evaporation, and the desired product, is recovered by methods of physical separation, e.g., filtration from the residual triphenyl phosphate or by chromatographic techniques. The compound is purified by recrystallization.

The (α-fluoroalkyl)benzoic acid 2-phenylhydrazide starting compounds of Formula II can be readily prepared by known methods. According to one method an (α-fluoroalkyl)benzoyl chloride or fluoride is reacted with a phenylhydrazine as described by J. Hausknecht, Chem. Ber. 22, p. 324 (1889), and E. Bamberger and W. Pemsel, Chem. Ber. 36, p. 359 (1903). Another method is described in U.S. Pat. No. 2,912,461, issued Nov. 10, 1959, that utilizes a benzoate ester and a phenylhydrazine. Still another method described by W. Autenrieth and G. Thomae, Chem. Ber. 57, p. 423 (1924) reacts a benzoic acid anhydride with a phenylhydrazine to produce the corresponding benzoic acid phenylhydrazide. Example 1 hereinafter illustrates a conventional method for making (α-fluoroalkyl)benzoic acid 2-phenylhydrazide starting compounds.

The new anti-arthropodal (α-fluoroalkyl)benzoyl chloride phenylhydrazones of this invention (compounds according to Formula I) can also be prepared by chlorinating an (α-fluoroalkyl)benzaldehyde phenylhydrazone. Chlorination of an (α-fluoroalkyl)benzaldehyde phenylhydrazone can be accomplished as described by J. E. Humphries, H. Humble and R. Evans, J. Chem. Soc. 127, p. 1304 (1925). But this chlorination is of limited usefulness when the starting (α-fluoroalkyl)benzaldehyde phenylhydrazone has unsubstituted active sites that will yield to chlorination at positions on the phenylhydrazone portion that are desired to remain unsubstituted in a particular instance. Direct chlorination of (α-fluoroalkyl)benzaldehyde phenylhydrazone is an effective way of producing (α-fluoroalkyl)-benzoyl chloride (2,4,6-trichlorophenyl)-hydrazone.

Still another method described by L. A. Jones, C. K. Hancock, and R. B. Seligman, J. Org. Chem. 26, p. 228 (1961) can be used. The described method utilized α,α,α-trichlorotoluene and 2,4-dinitrophenylhydrazine to produce benzoyl chloride (2,4-dinitrophenyl)hydrazone. The new compounds of this invention can be prepared in the same manner.

EXAMPLE 1

Preparation of α,α,α-Trifluoro-m-Toluoyl Chloride Phenylhydrazone

Part A m-(Trifluoromethyl)benzoic acid 2-phenylhydrazide

To a cooled solution of 35.0 g. (0.323 mole) phenylhydrazine in 300 ml. pyridine at 4° to 9° C. was added 57.6 g. (0.300 mole) m-trifluoromethylbenzoyl fluoride. The reaction mixture was set aside at about 25° C. for 6 days. It was then poured into water and the aqueous mixture was stirred until crystallization was completed. The crystals were collected on a filter, washed with water, washed with 1 N hydrochloric acid, and washed with water again before recrystallization from aqueous ethanol. A further recrystallization from a mixture of benzene and technical hexane gave 72.3 g. (85.9% yield) of m-(trifluoromethyl)benzoic acid 2-phenylhydrazide having a melting point at 116° to 117.5° C. An analytical sample recrystallized from a mixture of 100 ml. benzene and 150 ml. technical hexane had substantially the same melting point.

Analysis: Calc'd. for $C_{14}H_{11}F_3N_2O$: C, 60.00; H, 3,96; F, 20.34; N, 10.00. Found: C, 60.40; H, 4.09; F, 19.96; N, 9.88.

Part B

α,α,α-Trifluoro-m-toluoyl chloride phenylhydrazone

To a suspension of 21.86 g. (0.105 mole) phosphorus pentachloride in 200 ml. carbon tetrachloride was added 28.02 g. (0.100 mole) m-trifluoromethylbenzoic acid 2-phenylhydrazide (prepared in Part A, above). The resulting suspension was stirred continuously at about 25° C. until evolution of gas decreased. The mixture was then heated to the reflux temperature. The solution thus obtained was chilled in crushed ice and 33 g. (0.350 mole) phenol in 75 ml. carbon tetrachloride was added. After removing the carbon tetrachloride by evaporation at 30° C., the solution of product in triphenylphosphate was set aside for 1 week at 4° C. When the product did not separate out, the solution was poured over a 1.3 kg. column of silica gel. The product was eluted with a mixture of 1 part benzene and 1 part technical hexane. After removing the solvents by evaporation there was obtained 27.88 g. (93.3% yield) of α,α,α-trifluoro-m-toluoyl chloride phenylhydrazone as a yellow solid. Recrystallization from 75 ml. petroleum ether gave the desired pure compound having a melting point at 54° to 56° C.

Analysis: Calc'd. for $C_{14}H_{10}ClF_3N_2$: C, 56.29; H, 3.37; Cl, 11.87; F, 19.08; N, 9.38. Found: C, 56.75; H, 3.56; Cl, 11.78; F, 18.74; N, 9.61.

EXAMPLE 2

Following the procedure of Example 1, Part A, but substituting
3-bromo-5-(trifluoromethyl)benzoyl fluoride,
2-chloro-5-(trifluoromethyl)benzoyl fluoride,
2-iodo-3-(trifluoromethyl)benzoyl fluoride,
2-fluoro-5-(trifluoromethyl)benzoyl fluoride,
4-methyl-3-(trifluoromethyl)benzoyl fluoride,
3-ethyl-5-(trifluoromethyl)benzoyl fluoride,
3-isopropyl-5-(trifluoromethyl)benzoyl fluoride,
3-butyl-5-(trifluoromethyl)benzoyl fluoride,
3-n-hexyl-5-(trifluoromethyl)benzoyl fluoride,
p-(trifluoromethyl)benzoyl fluoride, o-(trifluoromethyl)benzoyl fluoride,
3,5-di(trifluoromethyl)benzoyl fluoride,
3-nitro-4-(trifluoromethyl)benzoyl fluoride,
4-nitro-2-(trifluoromethyl)benzoyl fluoride,
m-(1,1-difluoroethyl)benzoyl fluoride,
3,5-dimethyl-4-(trifluoromethyl)benzoyl fluoride,
2-chloro-6-methyl-4-(trifluoromethyl)benzoyl fluoride, and
m-(1,1-difluoropropyl)benzoyl fluoride for m-trifluoro-methylbenzoyl fluoride,
there is prepared:
3-bromo-5-(trifluoromethyl)benzoic acid 2-phenylhydrazide,
2-chloro-5-(trifluoromethyl)benzoic acid 2-phenylhydrazide,
2-iodo-3-(trifluoromethyl)benzoic acid 2-phenylhydrazide,
2-fluoro-5-(trifluoromethyl)benzoic acid 2-phenylhydrazide,
4-methyl-3-(trifluoromethyl)benzoic acid 2-phenylhydrazide,
3-ethyl-5-(trifluoromethyl)benzoic acid 2-phenylhydrazide,
3-isopropyl-5-(trifluoromethyl)benzoic acid 2-phenylhydrazide,
3-butyl-5-(trifluoromethyl)benzoic acid 2-phenylhydrazide,
3-n-hexyl-5-(trifluoromethyl)benzoic acid 2-phenylhydrazide,
p-(trifluoromethyl)benzoic acid 2-phenylhydrazide,
o-(trifluoromethyl)benzoic acid 2-phenylhydrazide,
3,5-di(trifluoromethyl)benzoic acid 2-phenylhydrazide,
3-nitro-4-(trifluoromethyl)benzoic acid 2-phenylhydrazide,
4-nitro-2-(trifluoromethyl)benzoic acid 2-phenylhydrazide,
m-(1,1-difluoroethyl)benzoic acid 2-phenylhydrazide,
3,5-dimethyl-4-(trifluoromethyl)benzoic acid 2-phenylhydrazide,
2-chloro-6-methyl-4-(trifluoromethyl)benzoic acid 2-phenylhydrazide, and
m-(1,1-difluoropropyl)benzoic acid 2-phenylhydrazide, respectively.

EXAMPLE 3

Further following the same procedure of Example 1, Part A, but substituting
(p-bromophenyl)hydrazine,
(p-chlorophenyl)hydrazine,
(p-nitrophenyl)hydrazine,
(2,4-diiodophenyl)hydrazine,
(p-ethylphenyl)hydrazine,
p-n--hexylphenyl)hydrazine,
(p-isopropylphenyl)hydrazine,
(2-chloro-4-nitrophenyl)hydrazine,
(4-methyl-2-nitrophenyl)hydrazine, and
(p-trifluoromethylphenyl)hydrazine for phenylhydrazine
there is prepared:
m-(trifluoromethyl)benzoic acid 2-(p-bromophenyl)-hydrazide,
m-(trifluoromethyl)benzoic acid 2-(p-chlorophenyl)-hydrazide,
m-(trifluoromethyl)benzoic acid 2-(p-nitrophenyl)-hydrazide,
m-(trifluoromethyl)benzoic acid 2-(2,4-diiodophenyl)-hydrazide,
m-(trifluoromethyl)benzoic acid 2-(p-ethylphenyl)-hydrazide,
m-(trifluoromethyl)benzoic acid 2-(p-n-hexylphenyl)hydrazide,
m-(trifluoromethyl)benzoic acid 2-(p-isopropylphenyl)-hydrazide,
m-(trifluoromethyl)benzoic acid 2-(2-chloro-4-nitrophenyl)hydrazide,
m-(trifluoromethyl)benzoic acid 2-(4-methyl-2-nitrophenyl)hydrazide, and
m-(trifluoromethyl)benzoic acid 2-(p-trifluoromethyl)hydrazide, respectively.

EXAMPLE 4

Following the procedure of Example 1, Part B, but substituting
3-bromo-5-(trifluoromethyl)benzoic acid 2-phenylhydrazide,
2-chloro-5-(trifluoromethyl)benzoic acid 2-phenylhydrazide,
2-iodo-3-(trifluoromethyl)benzoic acid 2-phenylhydrazide,
2-fluoro-5-(trifluoromethyl)benzoic acid 2-phenylhydrazide,
4-methyl-3-(trifluoromethyl)benzoic acid 2-phenylhydrazide,
3-ethyl-5-(trifluoromethyl)benzoic acid 2-phenylhydrazide,
3-isopropyl-5-(trifluoromethyl)benzoic acid 2-phenylhydrazide,
3-butyl-5-(trifluoromethyl)benzoic acid 2-phenylhydrazide,
3-n-hexyl-5-(trifluoromethyl)benzoic acid 2-phenylhydrazide,
p-(trifluoromethyl)benzoic acid 2-phenylhydrazide,
o-(trifluoromethyl)benzoic acid 2-phenylhydrazide,
3,5-di-(trifluoromethyl)benzoic acid 2-phenylhydrazide,
3-nitro-4-(trifluoromethyl)benzoic acid 2-phenylhydrazide,
4-nitro-2-(trifluoromethyl)benzoic acid 2-phenylhydrazide,
m-(1,1-difluoroethyl)benzoic acid 2-phenylhydrazide,
3,5-dimethyl-4-(trifluoromethyl)benzoic acid 2-phenylhydrazide,
2-chloro-6-methyl-4-(trifluoromethyl)benzoic acid 2-phenylhydrazide,
m-(1,1-difluoropropyl)benzoic acid 2-phenylhydrazide,
m-(trifluoromethyl)benzoic acid 2-(p-bromophenyl)hydrazide,
m-(trifluoromethyl) acid 2-(p-chlorophenyl)hydrazide,
m-(triluoromethyl)benzoic acid 2-(p-nitrophenyl)-hydrazide,
m-(trifluoromethyl)benzoic acid 2-(2,4-diiodophenyl)hydrazide,
m-(trifluoromethyl)benzoic acid 2-(p-ethylphenyl)-hydrazide,
m-(trifluoromethyl)benzoic acid 2-(p-n-hexylphenyl)hydrazide,
m-(trifluoromethyl)benzoic acid 2-(p-isopropylphenyl)hydrazide,
m-(trifluoromethyl)benzoic acid 2-(2-chloro-4-nitrophenyl)hydrazide, and m-(trifluormethyl)benzoic acid 2-(4-methyl-2-nitrophenyl)hydrazide m-(trifluoromethyl)benzoic acid 2-(p-trifluoromethyl)hydrazide for m-(trifluoromethyl)benzoic acid 2-phenylhydrazide, there were prepared 3-bromo-5-(trifluoromethyl)benzoyl chloride phenylhydrazone, 2-chloro-5-(trifluoromethyl)benzoyl chloride phenylhydrazone, 2-iodo-3-(trifluoromethyl)benzoyl chloride phenylhydrazone, 2-fluoro-5-(trifluoromethyl)benzoyl chloride phenylhydrazone, 4-methyl-3-(trifluoromethyl)benzoyl chloride phenylhydrazone, 3-ethyl-5-(trifluoromethyl)benzoyl chloride phenylhydrazone, 3-isopropyl-5-(trifluoromethyl)benzoyl chloride phenylhydrazone, 3-butyl-5-(trifluoromethyl)benzoyl chloride phenylhydrazone, 3-n-hexyl-5-(trifluoromethyl)benzoyl chloride phenylhydrazone, p-(trifluoromethyl)benzoyl chloride phenylhydrazone, o-(trifluoromethyl)benzoyl chloride phenylhydrazone, 3,5-di-(trifluoromethyl)benzoyl chloride phenylhydrazone, 3-nitro-4-(trifluoromethyl)benzoyl chloride phenylhydrazone, 4-nitro-2-(trifluoromethyl)benzoyl chloride phenylhydrazone, m-(1,1-difluoroethyl)benzoyl chloride phenylhydrazone, 3,5-dimethyl-4-(trifluoromethyl)benzoyl chloride phenylhydrazone, 2-chloro-6-methyl-4-(trifluoromethyl)benzoyl chloride phenylhydrazone, m-(1,1-difluoropropyl)benzoyl chloride phenylhydrazone, m-(trifluoromethyl)benzoyl chloride (p-bromophenyl)hydrazone, m-(trifluoromethyl)benzoyl chloride (p-chlorophenyl)hydrazone, m-(trifluoromethyl)benzoyl chloride (p-nitrophenyl)hydrazone, m-(trifluoromethyl)benzoyl chloride (2,4-diiodophenyl)hydrazone, m-(trifluoromethyl)benzoyl chloride (p-ethylphenyl)hydrazone, m-(trifluoromethyl)benzoyl chloride (p-n-hexylphenyl)hydrazone, m-(trifluoromethyl)benzoyl chloride (p-isopropylphenyl)hydrazone, m-(trifluoromethyl)benzoyl chloride (2-chloro-4-nitrophenyl)hydrazone, m-(trifluoromethyl)benzoyl chloride (4-methyl-2-nitrophenyl)hydrazone, and m-(trifluoromethyl)benzoyl chloride (p-trifluoromethylphenyl)hydrazine, respectively.

EXAMPLE 5

Preparation of $\alpha,\alpha,\alpha$-Trifluoro-m-toluoyl chloride (2,4-dibromophenyl)hydrazone To an ice-cold solution of 5.28 g. (0.0200 mole) $\alpha,\alpha,\alpha$-trifluoro-m-toluoyl chloride phenylhydrazone in 200 ml. carbon tetrachloride is added 10.8 g. (0.0675 mole) bromine dissolved in 25 ml. carbon tetrachloride. The solution is heated at the reflux temperature for 4 hrs., and then the carbon tetrachloride is removed by evaporation under reduced pressure. The residue thus obtained is recrystallized from technical hexane to give the desired $\alpha,\alpha,\alpha$-trifluoro-m-toluoyl chloride (2,4-dibromophenyl)hydrazone.

The new anti-arthropodal ($\alpha$-fluoroalkyl)benzoyl chloride phenylhydrazones of Formula I can be used as the pure compounds, such as those described in the Examples, or as technical grade compounds from commercial production; but for practical reasons, the compounds are preferably formulated with a diluent carrier with or without adjuvants for use against arthropod pests. There are many different kinds of diluent carriers suitable for the method and formulation embodiments of this invention. Dispersible carriers are commonly used in the art. Such carriers may or may not include adjuvants such as wetting agents, emulsifying agents, stickers, and other components that indirectly promote efficacy.

For example, pesticidal formulations useful against arthropods which become epidemic can be formulated as dusts, wettable powders, emulsifiable concentrates, aqueous dispersions, solutions and flowable creams for application to a situs, animals, and foliage, seeds or other parts of plants. Granular formulations can be prepared and applied to soil or on other surfaces. Moreover, the new ($\alpha$-fluoroalkyl)benzoyl chloride phenylhydrazones of the invention can be the sole active agent in a formulation or other insecticidal, miticidal, fungicidal, virucidal, bactericidal, or synergistic components may be included.

The new ($\alpha$-fluoroalkyl)benzoyl chloride phenylhydrazones can be readily formulated as dusts by grinding a mixture of the compound and a pulverulent carrier in the presence of each other. Grinding is conveniently accomplished in a ball mill, a hammermill, or by air-blast micronization. A suitable ultimate particle size is less than 60 microns. Preferably, 95% of the particles are less than 50 microns, and about 75% are 5 to 20 microns. Dusts of that degree of comminution are conveniently free-flowing and can be applied to animals, inanimate matter, fruit trees, crop plants, and soil so as to effect thorough distribution and coverage. Dusts are particularly adapted for effectively controlling insects and mites over wide areas when applied by airplane. They are also indicated for application to the undersides of plant foliage and to the skin of poultry and hairy animals.

Representative suitable pulverulent carriers include the natural clays such as China, Georgia, Barden, attapulgus, kaolin, and bentonite clays; minerals in their natural forms as they are obtained from the earth such as talc, pyrophyllite, quartz, diatomaceous earth, fuller's earth, chalk, sulfur, silica and silicates; chemically modified minerals such as washed bentonite and colloidal silica; and organic flours such as wood, walnut shell, soybean, cottonseed, and tobacco flours, and free-flowing, hydrophobic starches.

Dusts can also be prepared by dissolving an (α-fluoroalkyl)benzoyl chloride phenylhydrazone in a volatile solvent such as methylene chloride, mixing the solution with a pulverulent carrier and evaporating the solvent.

The proportions of pulverulent carrier and (α-fluoroalkyl)benzoyl chloride phenylhydrazone can vary over a wide range depending upon the insects, spiders, ticks, or mites to be controlled and the conditions of treatment. In general, dust formulations can contain up to about 90% (on a weight basis) of the active ingredient. Dusts having as little as 0.001% of the active ingredient can be used, but a generally preferred proportion is from about 0.50% to about 20% of active ingredient.

The dispersible powder formulations of this invention are prepared by incorporating a surfactant in a dust formulation prepared as described above. When about 0.1% to about 12% of a surfactant is incorporated in a dust, the dispersible powder thus obtained is particularly adapted for further admixture with water for spraying on inanimate matter and products, fruit trees, field crops, soil, and livestock. The dispersible powders can be admixed with water to obtain any desired concentration of active ingredient, and the mixture can be applied in amounts sufficient to obtain predetermined rates of application and uniform distribution. With this flexibility in mind, the dispersible powders of the invention can conveniently comprise preferably about 10 to about 80% of active ingredient.

Representative surfactants useful for preparing dispersible powder formulations of this invention include alkyl sulfates and sulfonates, alkyl aryl sulfonates, sulfosuccinate esters, polyoxyethylene sulfates, polyoxyethylenesorbitan monolaurate, alkyl aryl polyether sulfates, alkyl aryl polyether alcohols, alkyl naphthalene sulfonates, alkyl quaternary ammonium salts, sulfated fatty acids and esters, sulfated fatty acid amides, glycerol mannitan laurate, polyalkylether condensates of fatty acids, lignin sulfonates, and the like. The preferred class of surfactants includes blends of sulfonated oils and polyalcohol carboxylic acid esters (Emcol H-77), blends of polyoxyethylene ethers and oil-soluble sulfonates (Emcol H-400), blends of alkyl aryl sulfonates and alkylphenoxy polyethoxy ethanols (Tritons X-151, X-161, X-171), e.g., about equal parts of sodium kerylbenzene sulfonate and isooctylphenoxy polyethoxy ethanol containing about 12 ethoxy groups, and blends of calcium alkyl aryl sulfonates and polyethoxylated vegetable oils (Agrimul $N_4S$). It will be understood, of course, that the sulfate and sulfonate surfactants suggested above will preferably be used in the form of their soluble salts, for example, their sodium salts. All of these surfactants are capable of reducing the surface tension of water to less than about 40 dynes per centimeter in concentrations of about 1% or less. The dispersible powder formulations can be prepared with a mixture of surfactants of the types indicated if desired.

A suitable dispersible powder formulation is obtained by blending and milling 327 lbs. of Georgia Clay, 4.5 lbs. of isooctylphenoxy polyethoxy ethanol (Triton X-100) as a wetting agent, 9 lbs. of a polymerized sodium salt of substituted benzoid long-chain sulfonic acid (Daxad 27) as a dispersing agent, and 113 lbs. of the active ingredient. The resulting formulation has the following percentage composition (parts herein are by weight unless otherwise specified).

| | |
|---|---|
| Active ingredient | 25% |
| Isooctylphenoxy polyethoxy ethanol | 1% |
| Polymerized sodium salt of substituted benzoid long-chain sulfonic acid | 2% |
| Georgia Clay | 72% |

This formulation, when dispersed in water at the rate of 10 lbs. per 100 gals., gives a spray formulation containing about 0.3% (3000 ppm) active ingredient which can be applied to insects, spiders, ticks, or mites, plants or other arthropod habitats, or to their foods for control of various arthropods.

If desired, dispersants such as methyl cellulose, polyvinyl alcohol, sodium ligninsulfonates, and the like can be included in the dispersible powder formulations of this invention. Adhesive or sticking agents such as vegetable oils, naturally occurring gums, casein, and others can also be included. Corrosion inhibitors such as epichlorohydrin and anti-foaming agents such as stearic acid can also be included.

The anti-arthropodal new (α-fluoroalkyl)benzoyl chloride phenylhydrazones of this invention can be applied to insects, spiders, ticks, mites, objects, or situs in aqueous sprays without a solid carrier. Since, however, the compounds themselves are relatively insoluble in water they are preferably dissolved in a suitable inert organic solvent carrier. Advantageously, the solvent carrier is immiscible with water so that an emulsion of the solvent carrier in water can be prepared. If, for example, a water-miscible solvent carrier such as ethanol is used the solvent carrier will dissolve in the water and any excess (α-fluoroalkyl)benzoyl chloride phenylhydrazone will be thrown out of solution. In an oil-in-water emulsion, the solvent phase is dispersed in the water phase and the dispersed phase contains the active ingredient. In this way, uniform distribution of a water insoluble active ingredient is achieved in an aqueous spray. A solvent carrier in which (α-fluoroalkyl)benzoyl chloride phenylhydrazones are highly soluble is desirable so that relatively high concentrations of active ingredient can be obtained. Sometimes, one or more solvent carriers with or without a cosolvent can be used in order to obtain concentrated solutions of the active ingredient, the main consideration being to employ a water-immiscible solvent for the active ingredient that will hold the compound in solution over the range of concentrations useful for applying to insects, spiders, ticks, and mites.

The emulsifiable concentrates of the invention are prepared, therefore, by dissolving the active ingredient and a surfactant in a substantially water-immiscible solvent carrier (i.e., a solvent carrier which is soluble in water to the extent of less than 2.5% by volume at temperatures of the order of 20° to 30° C.), for example, cyclohexanone, methyl propyl ketone, summer oils, ethylene dichloride, aromatic hydrocarbons such as benzene, toluene, and xylene, and high-boiling petroleum hydrocarbons such as kerosene, diesel oil, and the like. If desired, a cosolvent such as methyl ethyl ketone, acetone, isopropanol, and the like can be included with the solvent carrier in order to enhance the solubility of the active ingredient. Aqueous emulsions are then prepared by mixing with water to give any desired concentration of active ingredient. The surfactants which can be employed in the aqueous emulsions of the invention are those types noted above. Mixtures of surfactants can be employed, if desired.

Advantageously, the concentration of active ingredient in the emulsifiable concentrates can range from about 5% to about 50% by weight, preferably from about 10 to about 40%. A concentrate comprising 20% (by weight) of the compound dissolved in a water-immiscible solvent of the kind noted above can be admixed with an aqueous medium in the proportions of 13 ml. of concentrate with 1 gal. of medium to give a mixture containing 700 parts of active ingredient per million parts of liquid carrier. Similarly, 1 qt. of a 20% concentrate mixed with 40 gals. of water provides about 1200 ppm (parts per million) of active ingredient. In the same manner, more concentrated solutions of active ingredient can be prepared.

The concentrate formulations of the invention which are intended for use in the form of aqueous dispersions or emulsions can also comprise a humectant, that is to say, an agent which will delay the drying of the composition in contact with material to which it has been applied. Suitable humectants include glycerol, diethylene glycol, solubilized lignins, such as calcium ligninsulfonate, and the like.

The granular formulations of this invention are convenient for application to soil when persistence is desired. Granulars are readily applied broadcast or by localized, e.g., in-the-run applications. The individual granules may be any desired size from 10 to 60 mesh, advantageously 20 to 40 mesh. Granulars are prepared by dissolving the active compound in a solvent such as methylene chloride, xylene, or acetone and applying the solution to a quantity of a granulated absorbent carrier. Representative granulated absorbent carriers include ground corn cobs, ground walnut shells, ground peanut hulls, and the like. If desired, the impregnated granulated absorbent carrier can be coated with a coating that will preserve the integrity of the granular until it is applied to an object or situs favorable for release of the active ingredient.

The rates of application to insects, spiders, ticks, mites, objects, or situs will depend upon the species of arthropod to be controlled, the presence or absence of desirable living organisms, temperature conditions of treatment, and the method and efficiency of application. In general, arthropocidal activity is obtained when the compounds are applied at concentrations of about 10 to about 6000 ppm, preferable at concentrations of about 30 to about 4000 ppm.

The formulations containing new (α-fluoroalkyl)-benzoyl chloride phenylhydrazones according to the invention, can be applied to insects, spiders, ticks, mites, objects or situs by conventional methods. For example, an area of soil, a building, or plants can be treated by spraying wettable powder suspensions, emulsions, or solutions from power sprayers or from hand-operated knapsack sprayers. Dips can be used for livestock. Dusts can be applied by power dusters, or by hand-operated dusters. Creams and ointment formulations can be applied to skin or objects for prolonged protection from insects, spiders, ticks, or mites.

The active compounds of the invention can also be formulated in relatively dilute proportions in a dispersible insecticide carrier for household applications. Thus, the active compounds can be formulated in dusts having from about 0.1 to 5.0% active ingredient with a dusting powder as hereinbefore described, and in solutions containing from about 0.01 to about 5.0% active ingredient with deodorized kerosene for aerosol applications.

It will of course be appreciated that the conditions encountered when applying the method and formulations of this invention to actual practice can vary widely. Included among the variables that may be encountered are the degree of infestation by the pests, the particular pest to be controlled, the particular situs being treated, the age or degree of development of animals or plants, the prevailing weather conditions, such as temperature, relative humidity, rainfall, dews, and so forth.

The compounds of Formula I are effective pesticides that can be used to control invertebrate pests in agriculture, in industry, and around the home. The compounds have been found to be active against invertebrate animals of the Phylum Arthropoda, illustratively Class Insecta, for example, order Coleoptera, more specifically, the cotton boll weevil (*Anthonomus grandis Boheman*), the confused flour beetle (*Tribolium confusum Jacquelin de Val*), and the Mexican bean beetle (*Epilachna varivestis Mulsant*), order Diptera, more specifically, the housefly (*Musca domestica Linnaeus*), order Orthoptera, more specifically, the house cricket (*Acheta domesticus Linnaeus*), and the German cockroach (*Blatella germanica Linnaeus*), and order Lepidoptera, more specifically, the Southern armyworm (*Prodenia eridanta Cramer*), and Class Arachnida, for example, order Acarina, more specifically, the two-spotted spider mite (*Tetranychus urticae Koch*).

Efficacy against invertebrate pests has been demonstrated at concentrations of 1000, 500, 100, 50, and even 10 ppm depending upon the specific insect or mite used. Some invertebrate animal pests will be more sensitive to the compounds than others, and others might be quite resistant. In general, the compounds of Formula I are used at concentrations ranging from about 30 to about 6000 ppm.

Compounds of the invention have also shown activity against parasitic worms, e.g., *Nematospiroides dubius* and *Syphacia obvelata*. The compound α,α,α-trifluoro-m-toluoyl chloride phenylhydrazone being particularly effective therefor.

I claim:

1. A method of combatting arthropod pests which comprises contacting the pests with an effective anti-arthropodal amount of an (α-fluoroalkyl)benzoyl chloride phenylhydrazone having the structural formula:

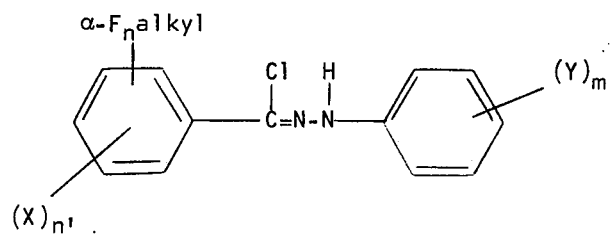

wherein α-F$_n$alkyl is an α-fluoroalkyl group of from 1 to 3 carbon atoms, inclusive; n is the integer 2 or 3; X is halogen, alkyl of from 1 to 6 carbon atoms, inclusive, α-F$_n$alkyl, or nitro; Y is halogen, alkyl of from 1 to 6 carbon atoms, inclusive, α-F$_n$alkyl, or nitro; $n'$ is an integer from 0 to 3, inclusive; and m is an integer from 0 to 3, inclusive; the sum of $n'$ + m being not more than 5, the sum of carbon atoms in alkyl substituents being not more than 15, there being no more than one nitro group in the molecule, and no more than two α-F$_n$alkyl groups on any one benzene ring or three total.

2. The method according to claim 1 wherein the compound is α,α,α-trifluoro-m-toluoyl chloride phenylhydrazone.

3. The method according to claim 1 wherein α-F$_n$alkyl is trifluoromethyl.

4. The method according to claim 3 wherein the trifluoromethyl group is in the meta position.

5. The method according to claim 4 wherein $n'$ is zero.

6. An anti-arthropodal composition comprising a dispersible carrier and an effective anti-arthropodal amount of an (α-fluoroalkyl)benzoyl chloride phenylhydrazone having the structural formula:

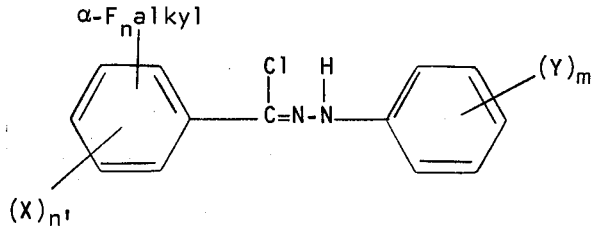

wherein α-F$_n$alkyl is an α-fluoroalkyl group of from 1 to 3 carbon atoms, inclusive; n is the integer 2 or 3; X is halogen, alkyl of from 1 to 6 carbon atoms, inclusive, α-F$_n$alkyl, or nitro; Y is halogen, alkyl of from 1 to 6 carbon atoms, inclusive, α-F$_n$alkyl, or nitro; $n'$ is an integer from 0 to 3, inclusive; and m is an integer from 0 to 3, inclusive; the sum of $n'$ + m being not more than 5, the sum of carbon atoms in alkyl substituents being not more than 15, there being no more than one nitro group in the molecule, and no more than two α-F$_n$alkyl groups on any one benzene ring or three total.

7. The composition according to claim 6 wherein the composition comprises surface active agents.

8. The composition according to claim 6 for controlling arthropod pests comprising the specific compound α,α,α-trifluoro-m-toluoyl chloride phenylhydrazone.

9. The composition according to claim 6 wherein α-F$_n$alkyl is trifluoromethyl.

10. The composition according to claim 9 wherein the trifluoromethyl group is in the meta position.

11. The composition according to claim 10 wherein $n'$ is zero.

12. The composition according to claim 7 wherein the dispersible carrier is a liquid.

13. The composition according to claim 7 wherein the dispersible carrier is a finely divided solid.

14. The composition according to claim 7 for combatting arthropod pests comprising the specific compound α,α,α-trifluoro-m-toluoyl chloride phenylhydrazone.

15. The composition according to claim 7 wherein α-F$_n$alkyl is trifluoromethyl.

16. The composition according to claim 15 wherein the trifluoromethyl group is in the meta position.

17. The composition according to claim 16 wherein $n'$ is zero.

* * * * *